(12) United States Patent
Xu et al.

(10) Patent No.: US 6,532,014 B1
(45) Date of Patent: Mar. 11, 2003

(54) CLOTH ANIMATION MODELING

(75) Inventors: Ying-Qing Xu, Beijing (CN);
Heung-Yeung Shum, Beijing (CN);
Chi-Yi Cheng, Beijing (CN)

(73) Assignee: Microsoft Corporation, Redmond, CA (US)

( * ) Notice: Subject to any disclaimer, the term of this patent is extended or adjusted under 35 U.S.C. 154(b) by 0 days.

(21) Appl. No.: 09/483,139

(22) Filed: Jan. 13, 2000

(51) Int. Cl.$^7$ .............................................. G06T 17/00
(52) U.S. Cl. ...................................................... 345/473
(58) Field of Search ................................ 345/418, 419, 345/473, 474

(56) References Cited

U.S. PATENT DOCUMENTS 5,850,222 A * 12/1998 Cone .......................... 345/418

OTHER PUBLICATIONS

Volino, Magnenat Thalmann, Efficient self–collision detection on smoothly discretized surface animations using geometrical shape regularity, Computer graphics forum (EuroGraphics proc.), vol. 13, pp 155–166, 1994.

Volino, Magnenat Thalmann, Jianhua, Thal–Mann, Collision and self–collision detection: Efficient and robust solutions for highly deformable surfaces, in 65$^{th}$ Eurographics workshop on animation and simulation, pp. 55–65, Maastricht, Sep. 1995.

Provot, Collision and self–collision handling in cloth model dedicated to design garments, Eurographics workshop on animation and simulation, Sep. 1997.

Baraff, Witkin, Dynamic simulation of non–penetrating flexible bodies, Computer Graphics (proc. Siggraph '92), 26(2), pp 303–308, 1992.

Baraff, Witkin, Global methods for Simulating Flexible Bodies, Computer Animation Proc, Springer–Verlag, pp 1–12, 1994.

Baraff, Eitkin, Large Steps in Cloth Simulation, Computer Graphics (Proc Siggraph), Aug. 1995.

Breen, House, Wozny, Predicting the Drape of Woven Cloth using Interacting Particles, Computer Graphics (proc. Siggraph'94), 28(4) pp 365–372, 1994.

Carignan, Yang, Magnenat Thalmann, Thalmann, Dressing Animated Synthetic Actors with Complex Deformable Clothes, Computer Graphics (proc Siggraph'92), 26(2), pp 99–104 (1992).

Gay, Ling, Damodaran, A quasi–steady force model for animating cloth motion, IFIP Trans Graphics Design and Visualisation, North Holland, pp. 357–363, 1993.

Ling, Damodaran, Gay. A model for animating cloth motion in air flow. TENCON 94, IEEE Region 10's Ninth Annual International Conference. Theme: Frontiers of Computer Technology. Proceedings of 1994.

Terzopoulos, Platt, Bar, Elastically deformable models, Computer graphics (proc. Siggraph 87), 21, pp 205–214, 1987.

(List continued on next page.)

*Primary Examiner*—Cliff N. Vo
(74) *Attorney, Agent, or Firm*—Lyon & Harr, LLP; Katrina A. Lyon

(57) ABSTRACT

A model for cloth, which allows for substantially real-time animation of the cloth, is disclosed. The latitudinal (vertical) nodes of the model are decoupled from the longitudinal (horizontal) nodes in one embodiment. In one embodiment, the latitudinal nodes are modeled as physical splines, and the longitudinal nodes are modeled as stiff multi-section rods between adjacent latitudinal nodes. The model is then rendered.

31 Claims, 7 Drawing Sheets

OTHER PUBLICATIONS

Terzopoulos, Fkeuscger, Deformable models, Visual Computer, vol. 4, No. 6, Dec. 1988, pp 306–331.

Volino, Magnenat Thalmann, Jianhua, Thal–Mann, An evolving system for simulating clothes on virtual actors, IEEE Computer Graphics and Applications, pp. 16–42, 1996.

Volino, Courchese, Magnenat–Thalmann, Versatile and Efficient Techniques for Simulating Cloth and Other Deformable Objects, Computer Graphics (proc Siggraph), Aug. 1995, pp 137–144.

Weil, The Synthesis of Cloth Objects, Computer Graphics (Proc. Siggraph), vol. 20, No. 4, Aug. 1986, pp. 49–54.

* cited by examiner

CLOTH ANIMATION MODELING

FIELD OF THE INVENTION

This invention relates generally to computer modeling, and more specifically to computer modeling of cloth animation.

BACKGROUND OF THE INVENTION

A common application for computers is three-dimensional (3D) modeling of objects, and the modeling of the animation of such objects. The modeling of rigid objects, such as automotive parts, human forms, etc., is fairly well developed within the prior art, including the modeling of the animation of such rigid objects in real-time. For example, with a relatively standard computer in terms of performance, rigid objects can be rotated and otherwise animated in real-time at fairly good speeds.

Conversely, however, the modeling of cloth, and the modeling of the animation of cloth, is not as well defined within the prior art. Cloth is generally difficult to model because it is not rigid, and thus reacts differently to forces such as wind, and also reacts and interacts differently with other objects that may be modeled. The modeling of the behavior of cloth is nevertheless important for the realistic animation of virtual worlds inhabited by people, for textile industry applications, etc.

Some current prior art cloth animation models treat cloth as a large number of coupled particles, where each particle is coupled to at least its nearest neighbors (usually, at least eight). While this achieves a certain degree of realism in animating cloth, the result is a set of complicated equations that are difficult to solve in real-time for even the most powerful commonly available computers. For example, it may take more than fifteen seconds to render a frame of animation of cloth, which effectively means that real-time animation is not possible.

Therefore, there is a need for models for cloth that provide for animation thereof substantially in real-time. For this and other reasons, there is a need for the present invention.

SUMMARY OF THE INVENTION

The invention relates to a model for cloth, such that the cloth can be animated in substantially real-time. In one embodiment, the latitudinal (or, vertical) nodes of a model for cloth are decoupled from the longitudinal (or, horizontal) nodes of the model. In one embodiment, a method first includes modeling the latitudinal nodes as physical splines, and then modeling the longitudinal nodes as stiff multi-section rods between horizontally adjacent latitudinal nodes. The term stiff can also be referred to as spline length preserving. The term multi-section rods can also be referred to as benders, or bended rods. The model is then rendered.

Embodiments of the invention provide for advantages not found within the prior art. Decoupling the latitudinal nodes from the longitudinal nodes in one embodiment provides for a mathematically simpler model of cloth, allowing for substantially faster frame-rendering times as compared to the prior art. This in turn allows for substantially real-time animation of the cloth.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
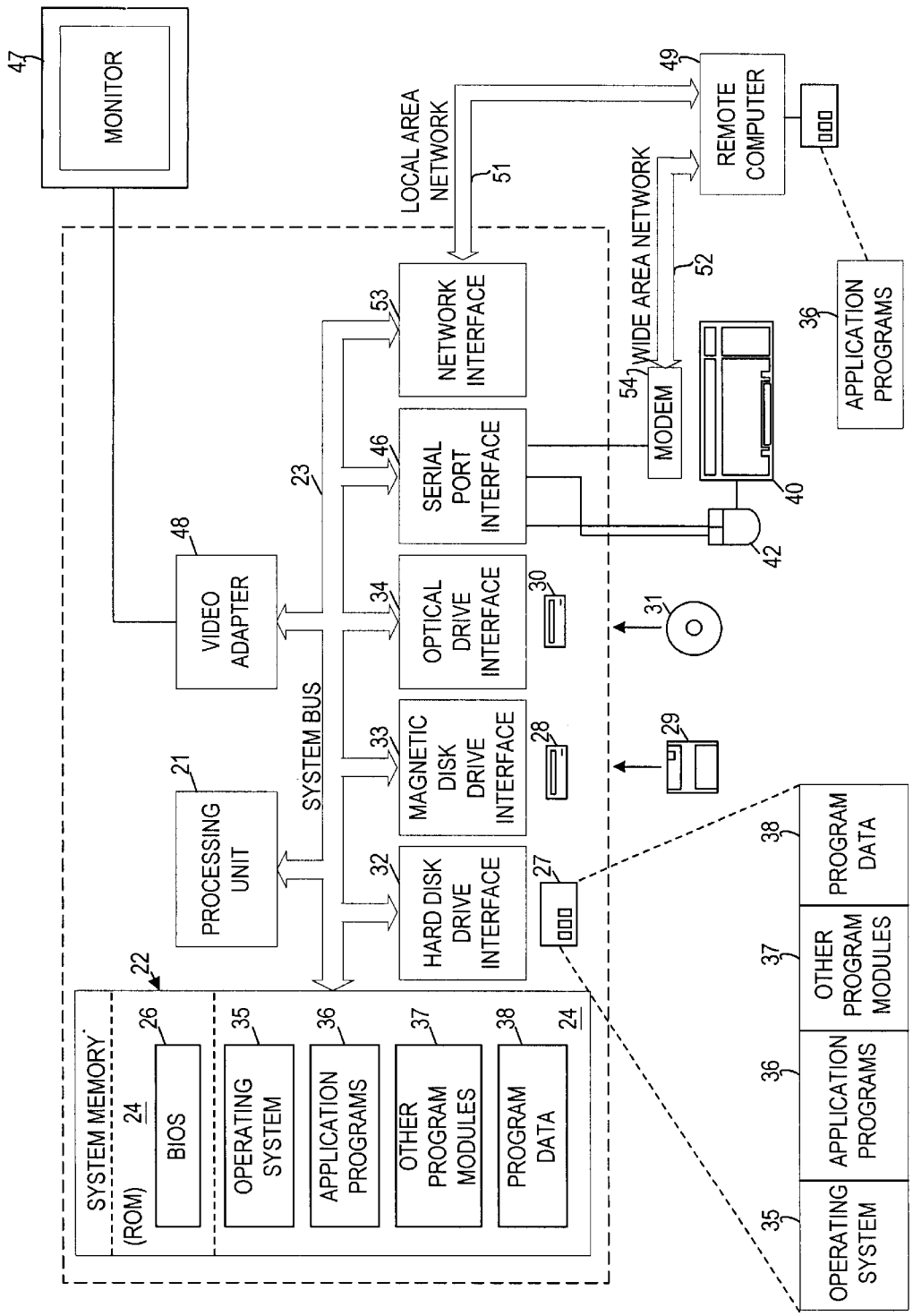
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs); and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Cloth Model

Figure 2:
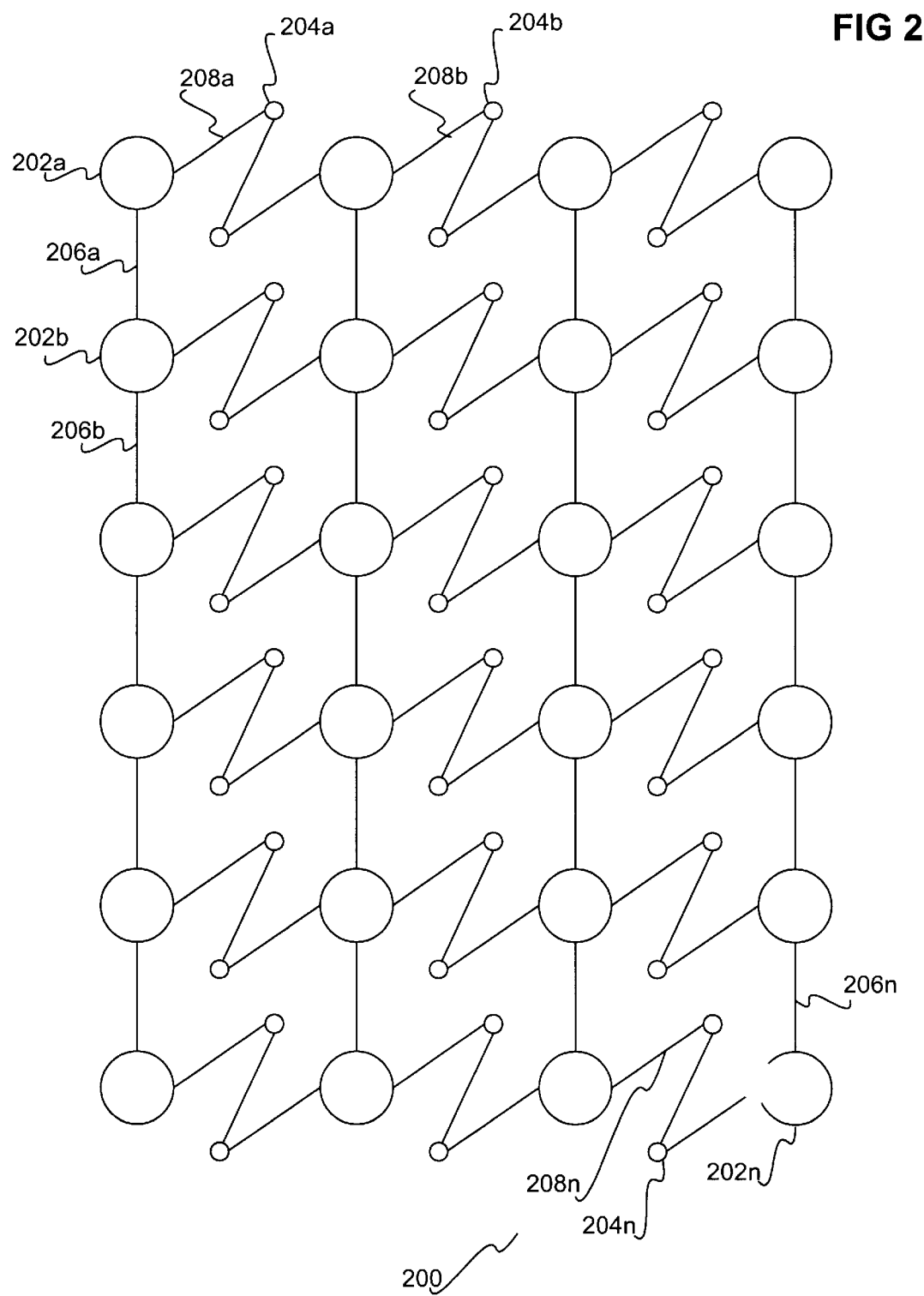
FIG. 2 is a diagram of a grid of decoupled first-level and second-level nodes for modeling cloth, according to an embodiment of the invention.

In this section of the detailed description, a model for cloth, according to an embodiment of the invention, is presented. Referring to FIG. 2, the model for cloth is presented as a grid 200. The grid 200 includes a number of first-level nodes 202a, 202b, . . . , 202n, and a number of second-level nodes 204a, 204b, . . . , 204n. Each of the nodes 202 and 204 is a separate mass point. The first-level nodes 202 are decoupled from the second-level nodes 204, in that substantially different and independent constraints govern the first-level nodes 202, as compared to the second-level nodes 204.

The first-level nodes 202 are governed by latitudinal (vertical) constraints, and are organized in columns. The nodes are considered first-level nodes in that their positions are determined first, prior to determining the positions of the second-level nodes. Where a first-level node has a neighbor first-level node below it, a physical spline connects the node and the neighbor node. Each first-level node of each column has a neighbor first-level node below it, except for the bottom-most first-level node of each column. Each column of first-level nodes can be likened to a complex pendulum.

There are physical splines 206a, 206b, . . . , 206n. The physical spline 206a, for example, connects the first-level node 202a with the first-level node 202b. Each physical spline 206 thus connects two first-level nodes 202, and is itself a semi-rigid rod. The splines are semi-rigid in that they cannot be stretched, but can undergo deformation such as bending—that is, the lengths of the splines remain fixed.

The second-level nodes 204 are governed by longitudinal (horizontal) constraints, and are organized such that a fixed number of such nodes lie between horizontally adjacent first-level nodes in the same row. The nodes are considered second-level nodes in that their positions are determined as a result of the positions of the first-level nodes, and thus are determined after the positions of the first-level nodes have been determined. Two adjacent first-level nodes in the same row are connected with a stiff m-fold (or, m-section or m-segment) rod, where a second-level node lies at the intersection between consecutive rods—that is, at the intersection between the trailing end point of a rod and the leading end point of an immediately adjacent rod. Therefore, there are (m−1) second-level nodes between each pair of adjacent first-level nodes in the same row.

There are stiff m-fold rods 208a, 208b, . . . , 208n. Each stiff m-fold rod has a fixed length with m segments, such that the total length of the m segments equals the fixed length of the rod. If the distance between two adjacent first-level nodes exceeds this fixed length, longitudinal constraints are added and adjustments are made for the positions of the first-level nodes. The position of the first-level nodes obtained by the latitudinal constraints determines the movement of the stiff multi-section rods, and thus determines the position of the second-level nodes.

As described, a cloth model in accordance with an embodiment of the invention decouples, or detaches, the latitudinal constraints from the longitudinal constraints. The motion of the first-level nodes is substantially determined by latitudinal constraints. The motion of the second-level nodes is substantially determined by longitudinal constraints.

The latitudinal (vertical) constraints on first-level nodes are now described in more detail. As has been described, first-level nodes are organized in columns and interconnected by physical splines. Each first-level node is a separate mass point. More specifically, each vertical column of first-level nodes is constrained by gravitational, air flow, damping, tension, and other forces; the invention is not limited to a particular type or number of forces to which the first-level nodes are subject. Therefore, for each first-level node, the resultant force is determined, and thus the velocity and position of each first-level node is also determined. This is accomplished in accordance with Newton's Law, as can be appreciated by those of ordinary skill within the art.

Figure 3:
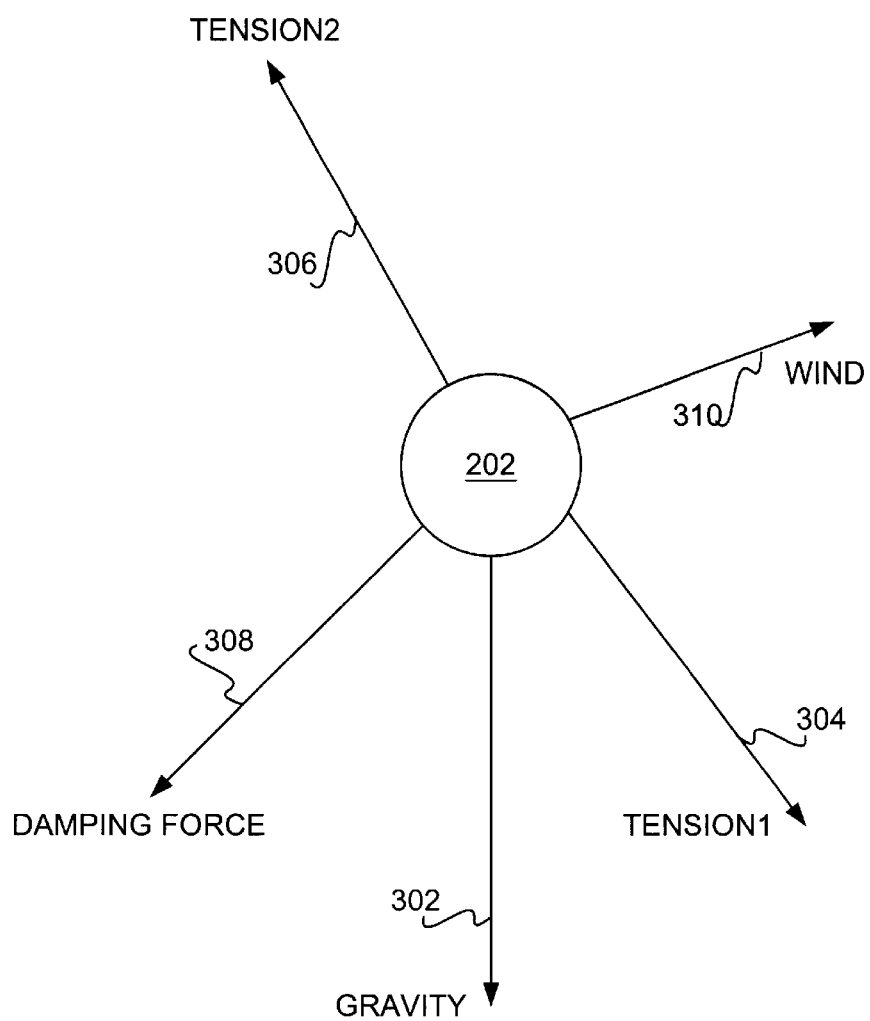
FIG. 3 is a diagram of a first-level node and the latitudinal constraints placed thereon, according to an embodiment of the invention.

This is shown in detail in FIG. 3, which is a diagram showing the forces exerted on a representative first-level node. The first-level node 202, as a mass point, has a gravitational force 302 exerted on it. If the node 202 is any node other than the top-most node of a column of nodes, then it has a tension force 306 exerted on it from its neighbor node above. Likewise, if the node 202 is any node other than the bottom-most node of a column of nodes, then it has a tension force 304 exerted on it from its neighbor node below. Other forces that can be exerted on the node 202 include a damping force 308, and a wind force 310. The damping force 308 is a result of air resistance of the cloth being modeled, of oil resistance if the cloth is immersed in oil, etc. The wind force 310 is the direct result of air flow that may cause the cloth to be set in motion.

The forces on a first-level node are thus added to determine the resulting force. For each column of first-level nodes, this process is accomplished bottom-up—that is, starting with the bottom-most node of the column, and then moving up the column until the top-most node is reached. From the resulting force on each first-level node, the velocity and position can then be determined according to Newton's Law, $$\frac{d^2x}{dt^2} = \frac{f}{m}.$$

With respect to wind force specifically, in one embodiment of the invention, a uniform force model is used that takes into account the porosity of the cloth and the viscosity of air, although the invention itself is not so limited—that is, other wind models, such as those known within the art within the field of aerodynamics, may also be used. In the embodiment using the uniform force model, if there is a parallel predefined wind source $f_w$, the force acting on each node of the cloth is determined as $$f = \frac{f_w(1 - c_\mu \mu) \cos \Psi}{c_d d^2}$$

where $\mu$ is defined as the porosity ratio controlling the amount of flow going perpendicularly through the cloth surface, as a fraction of the free stream velocity normal to the cloth surface; $\Psi$ is the angle between the direction of wind force $f_w$ and the mean normal of each node, where the mean normal is the normalized average normal vector of all triangles connected to the node; d is the distance between the wind source and the node; and, $c_\mu$ and $c_d$ are their corresponding weights, as can be determined experimentally, for example. Furthermore, in one embodiment, random disturbance on the force acting on each node can be added to simulate the unsteadiness of airflow, as can be appreciated by those of ordinary skill within the art.

Next, with respect to damping force specifically, only the air resistance is considered on the assumption that the cloth being modeled is placed in air, in one embodiment. Air resistance is determined by $$f_r = \rho c_r A v^2,$$

where $\rho$ is the density of air, which in one embodiment is constant based on the assumption that the air is incompressible; A is the surface patch perpendicular to the velocity $v_{ij}$ of each node; and, $c_r$ is the resistance coefficient.

Next, longitudinal (horizontal) constraints on second-level nodes are described in more detail. As has been described, second-level nodes are situated between adjacent horizontal first-level nodes, and are separate mass points. Between such adjacent horizontal first-level nodes is a stiff m-fold rod, such that (m−1) second-level nodes are positioned between each immediately consecutive rolling pair of folds of the rod. The invention is not particularly limited to a given value for m, that is, to a given number of folds. In one embodiment, six folds are used, while in another embodiment, anywhere from one to eight folds are used. As used herein, folds can also be referred to as segments, or sections.

Figure 4:
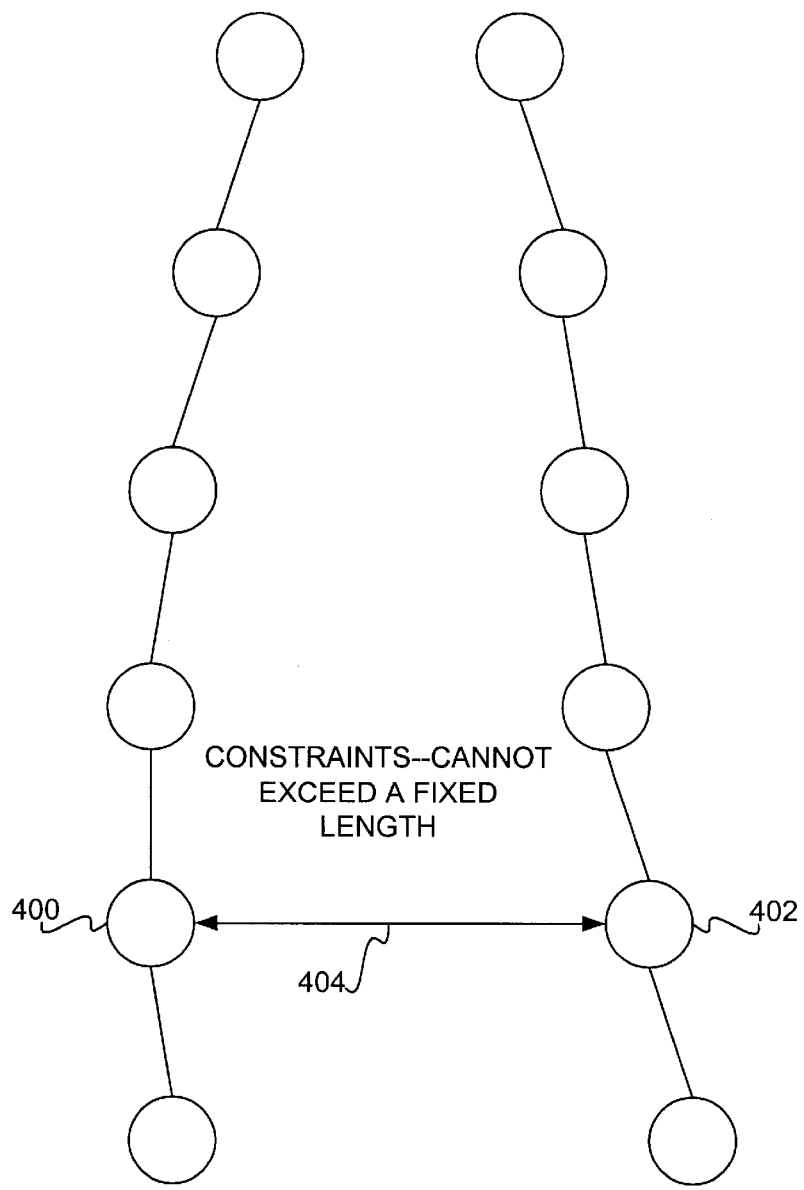
FIG. 4 is a diagram showing that the distance between two adjacent first-level nodes cannot exceed the length of the stiff m-fold rod, according to one embodiment of the invention.

It is noted that where each fold of the rod is at a 180 degree angle with every other fold of the rod, such that there are no bends or creases therein (i.e., the rod is completely straight, or flat, and not bent), the maximum length between two horizontally consecutive first-level nodes has been reached. This corresponds to the resting state of the cloth being modeled, when there are no creases therein. Thus, the distance between two horizontally adjacent first-level nodes cannot be greater than the maximum length of the rod; if it is, as determined as a result of the latitudinal constraints on the first-level nodes, then the positions of these nodes are adjusted. This is represented in FIG. 4, in which diagram the distance between two first-level nodes 400 and 402 cannot exceed the distance 404, which is presumed to be the distance of the m-fold rod.

Therefore, after the positions of the first-level nodes have been determined by the latitudinal constraints, and adjusted by the longitudinal constraints as necessary as described in the preceding paragraph, then the longitudinal constraints are used to determine the movement of the stiff m-fold rods. The movement of the stiff m-fold rods is then in turn used to determine the position of the second-level nodes, in one embodiment. Thus, the longitudinal constraints are used to determine the position of the second-level nodes. Put another way, the sections of a given stiff m-fold rod lie on a plane within the three-dimensional space as determined by the already-determined position of the first-level nodes, and the predetermined length of the rod. Once this plane has been determined, the position of the second-level nodes is also determined, as a result. The longitudinal constraints, in other words, are those constraints as dictated by the positions of the first-level nodes and as to which the second-level nodes are subject, as compared to the latitudinal constraints, which are constraints dictated by the forces exerted on the first-level nodes themselves.

Figure 7:
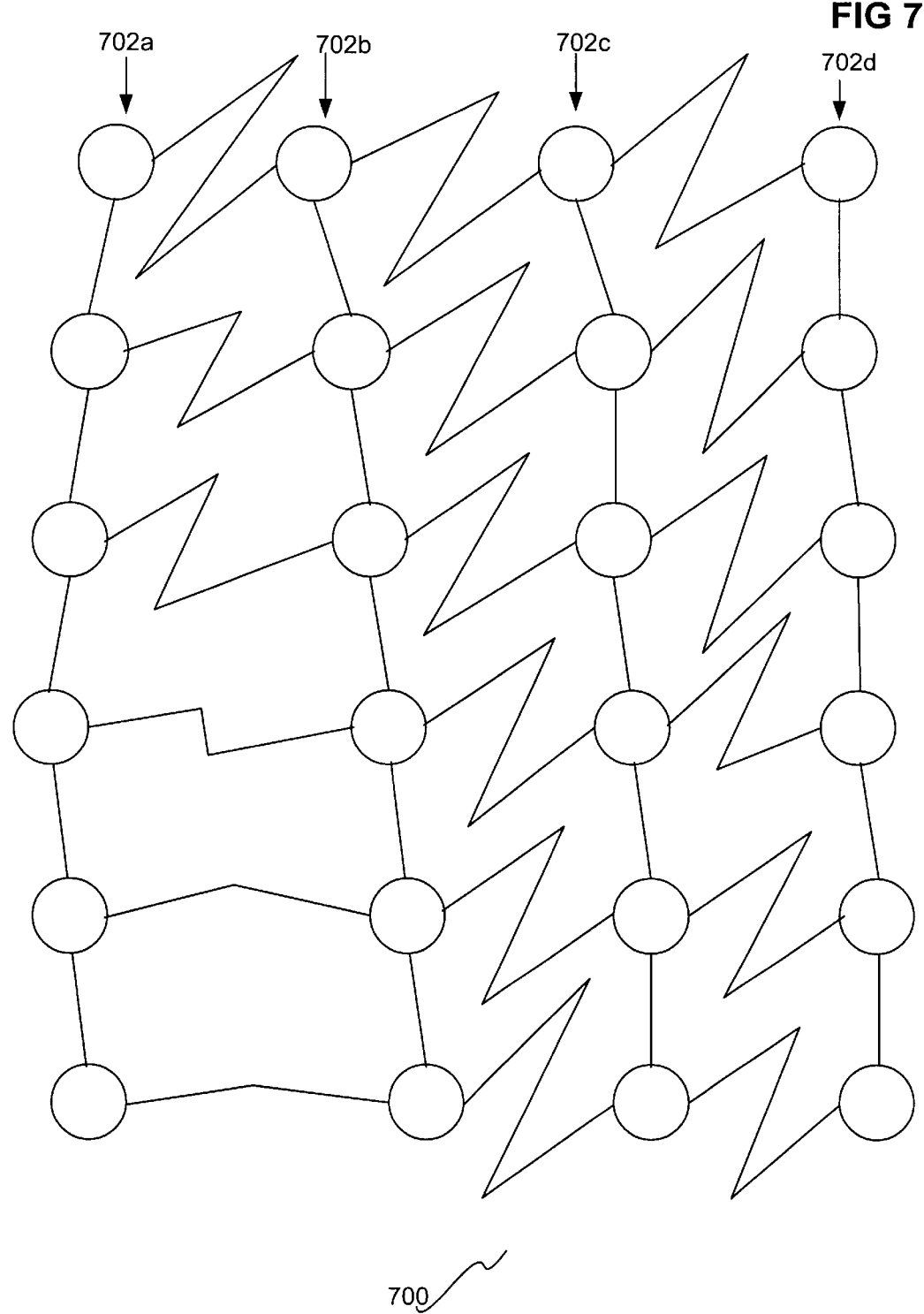

An example cloth model that has been affected by latitudinal and longitudinal constraints is shown in the diagram of FIG. 7. The model 700 has four columns of first-level nodes 702a, 702b, 702c and 702d. Between horizontally adjacent first-level nodes of the columns are stiff m-fold rods having second-level nodes where their end points meet one another. As shown in FIG. 7, the rods are 3-fold. It is noted that in the example diagram of FIG. 7, the cloth model has been affected by latitudinal constraints such that the pendular columns 702a, 702b, 702c and 702d of first-level nodes are not perfectly vertical. As a result, the positions of the first-level nodes act as longitudinal constraints on the then-determined second-level nodes, by acting as a constraint, along with the length of the stiff 3-fold rods, as to the plane each individual rod can exist. This in turn determines the positions of the second-level nodes themselves.

It is noted that the model as has been described specifically relates to a cloth model. However, the invention is not limited to this specific embodiment. The invention generally is applicable to a model for any material that has characteristics such as hanging, draped, cascading, and/or flowing, as can be appreciated by those of ordinary skill within the art. Furthermore, it is noted that besides wind forces, other external forces, such as gravity forces, tension forces, etc., are applicable to determination in varying embodiments of the invention.

Methods

Figure 5:
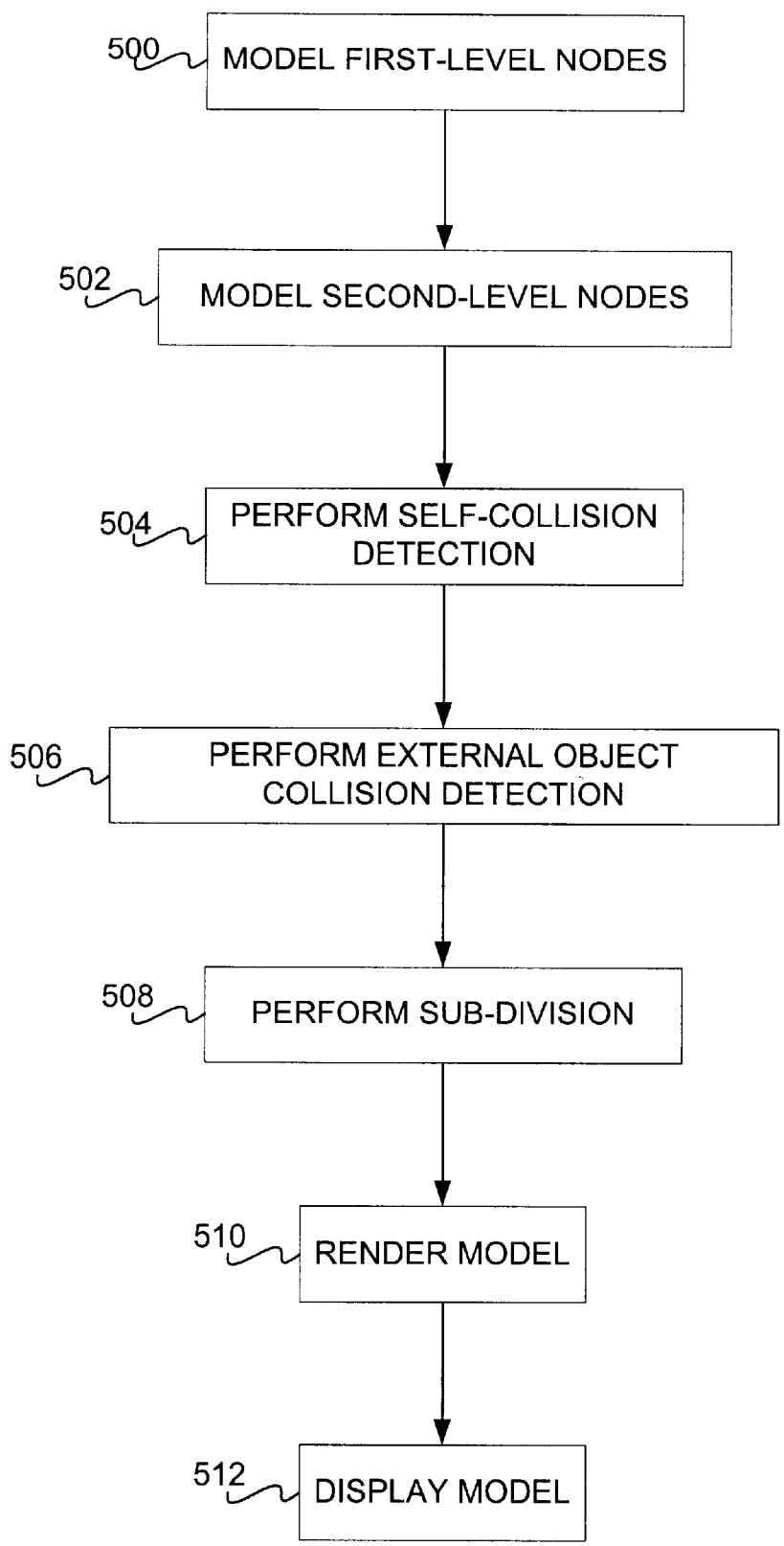
FIG. 5 is a flowchart of a method according to an embodiment of the invention.

In this section of the detailed description, methods according to varying embodiments of the invention are described. The description is made with reference to FIG. 5, which is a flowchart of a computer-implemented method according to one embodiment of the invention. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

In 500, the first-level latitudinal nodes of a cloth model are modeled as physical splines, as specifically described in the previous section of the detailed description. That is, the position of the first-level nodes is determined by considering substantially latitudinal constraints only. In 502, the second-level longitudinal nodes of the cloth model are modeled as stiff multi-section rods between adjacent first-level nodes, as has also been specifically described in the previous section of the detailed description. That is, the position of the second-level nodes is determined based upon the already-determined positions of the first-level nodes, and by considered the longitudinal constraints placed thereon by the first-level nodes. It is noted that modeling the first-level nodes separate from the second-level nodes achieves a decoupling of the former nodes from the latter nodes that makes for a mathematically simpler model.

In one embodiment, in 504, self-collision detection is performed. Self-collision detection determines whether the cloth model is colliding with itself—whether any of the first-level and the second-level nodes are colliding with any of the other first-level and the second-level nodes. In one embodiment, this is accomplished by classical methods known within the art. For example, such methods are described in the reference J. Weil "The Synthesis of Cloth Objects", Computer Graphics (Proc. Siggraph), Vol. 20, No. 4, August 1986, pp.49–54.

Next, in one embodiment, in 506, external object collision detection is performed. This collision detect determines whether the cloth model has collided with any external object or objects. More specifically, it determines whether any of the first-level and the second-level nodes has collided with any external object or objects. Such objects can include inanimate background objects, such as tables, chairs, etc., as well as animate objects such as people on which the cloth is being worn. The invention is not so limited, however. In one embodiment, external object collision detection is also accomplished by classical methods as known within the art, such as those described in the following references P. Volino, N. Magnenat Thalmann, "Efficient Self-collision Detection on smoothly discretized surface animations using geometrical shape regularity", Computer Graphics Forum, (EuroGraphics Proc.), volume 13, pp. 155–166, 1994; P. Volino, N. Magnenat Thalmann, S. Jianhua, and D. Thalmann. "Collision and Self-collision detection: Efficient and Robust solutions for highly deformable surfaces", In $6^{th}$ Eurographics Workshop on Animation and Simulation, pp. 55–65, Maastricht, September 1995; and, X. Provot, "Collision and self-collision handling in cloth model dedicated to design garments" Eurographics Workshop on Animation and Simulation, September 1997.

Next, in one embodiment, in 508, sub-division is performed to smooth the cloth model. For example, a third level of nodes can be added by interpolation among the first-level and the second-level nodes, which effectively smoothes the model. As another example, a many-knot spline can be used to further sub-divide the model for smoothing purposes. The invention is not limited to a particular manner to accomplish sub-division and smoothing, however. In one embodiment, sub-division and smoothing methods as described in D. Baraff et al., "Large steps in cloth simulation," Computer Graphs (SIGGRAPH'98), 1998, pages 43–54, are used.

Finally, the cloth model is rendered in 510, as it has been modeled by the first-level and the second-level nodes, and displayed on a display in 512. The method of FIG. 5 can in one embodiment correspond to a single frame of a cloth animation. Thus, the method of FIG. 5 can be repeated in this embodiment for each frame of the cloth animation desired. Because the decoupling of the latitudinal from the longitudinal nodes results in a mathematically simpler model, the rendering of each frame of the model can be accomplished substantially in real-time, such that the resulting animation is substantially in real-time.

System

Figure 6:
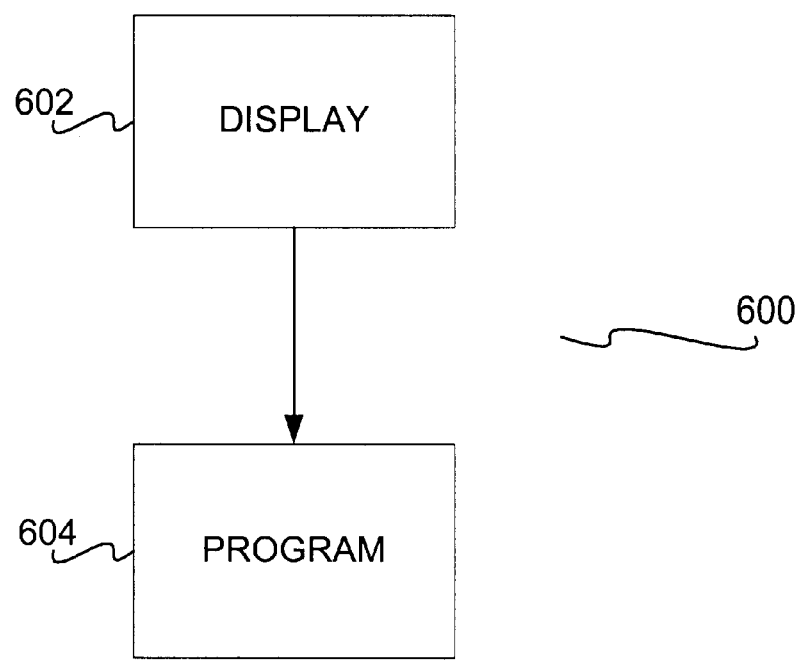
FIG. 6 is a diagram of a system according to an embodiment of the invention; and, FIG. 7 is a diagram of an example cloth model according to an embodiment of the invention.

In this section of the detailed description, a description of a system according to an embodiment of the invention is provided. The description is made with reference to FIG. 6. Referring now to FIG. 6, the system 600 includes a display 602 and a computer program 604. The system 600 can in one embodiment correspond to a computer such as that already described in conjunction with FIG. 1. Furthermore, the computer program 604 can in one embodiment be executed by a processor from a computer-readable medium, both of which are not shown in FIG. 6, however.

The program 604 is designed to mode a cloth model having latitudinal nodes decoupled from longitudinal nodes and to render the cloth model as modeled. The model as rendered is then displayed on the display 602. In one embodiment, the decoupling of latitudinal from longitudinal nodes is accomplished as has been described in the preceding two sections of the detailed description. Furthermore, in one embodiment, the program 604 can be considered a means for modeling the cloth model as having first-level nodes decoupled from second-level nodes, and for rendering the model for display.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for modeling material animation comprising:
    modeling first-level latitudinal nodes of a material model as a plurality of physical splines;
    modeling second-level longitudinal nodes of the material model as a plurality of stiff multi-section rods between adjacent first-level latitudinal nodes; and,
    rendering the material model as modeled by the first-level latitudinal nodes and the second-level longitudinal nodes.

2. The method of claim 1, wherein the material model comprises a cloth model.

3. The method of claim 1, wherein the material model comprises a model for a material selected from the group essentially consisting of: a hanging material, a draped material, a cascading material, and a flowing material.

4. The method of claim 1, further comprising displaying the material model as rendered.

5. The method of claim 1, further comprising prior to rendering the material model, performing self-collision detection among the first-level latitudinal nodes and the second-level longitudinal nodes of the material model.

6. The method of claim 1, further comprising prior to rendering the material model, performing collision detection between the material model and one or more external objects.

7. The method of claim 1, further comprising prior to rendering the material model, performing sub-division to smooth the material model prior to rendering.

8. The method of claim 1, wherein modeling first-level latitudinal nodes of a material model as a plurality of physical splines comprises determining external forces on each of the first-level latitudinal nodes of each physical spline.

9. The method of claim 8, wherein determining external forces comprises determining external forces consisting essentially of: force of gravity, wind forces, and tension forces of other nodes.

10. The method of claim 1, wherein modeling second-level longitudinal nodes of the material model as a plurality of stiff multi-section rods between adjacent first-level latitudinal nodes comprises determining position of the second-level longitudinal nodes based on position of the first-level latitudinal nodes as modeled as the plurality of physical splines.

11. A machine-readable medium having instructions stored thereon for execution by a processor to perform a method comprising:
    modeling first-level latitudinal nodes of a cloth model as a plurality of physical splines;
    modeling second-level longitudinal nodes of the cloth model as a plurality of stiff multi-section rods between adjacent first-level latitudinal nodes;
    performing collision detection on the cloth model; and,
    rendering the cloth model as modeled by the first-level latitudinal nodes and the second-level longitudinal nodes.

12. The medium of claim 11, wherein the method further comprises displaying the cloth model as rendered.

13. The medium of claim 11, wherein performing collision detection comprises performing self-collision detection among the first-level latitudinal nodes and the second-level longitudinal nodes of the cloth model.

14. The medium of claim 11, wherein performing collision detection comprises performing collision detection between the cloth model and one or more external objects.

15. The medium of claim 11, wherein the method further comprises prior to rendering the cloth model, performing sub-division to smooth the cloth model prior to rendering.

16. The medium of claim 11, wherein modeling first-level latitudinal nodes of a cloth model as a plurality of physical splines comprises determining external forces on each of the first-level latitudinal nodes of each physical spline.

17. The medium of claim 16, wherein determining external forces comprises determining external forces consisting essentially of: force of gravity, wind forces, and tension forces of other nodes.

18. The medium of claim 11, wherein modeling second-level longitudinal nodes of the cloth model as a plurality of stiff multi-section rods between adjacent first-level latitudinal nodes comprises determining position of the second-level longitudinal nodes based on position of the first-level latitudinal nodes as modeled as the plurality of physical splines.

19. A computerized system comprising:
    display on which to display a cloth model as rendered; and, a computer program designed to model the cloth model having a plurality of latitudinal nodes decoupled from a plurality of longitudinal nodes and to render the cloth model as modeled.

20. The system of claim 19, further comprising:

a processor; and, a computer-readable medium, wherein the computer program is executed by the processor from the medium.

21. The system of claim 19, wherein the computer program is further designed to model the plurality of latitudinal nodes of the cloth model as a plurality of physical splines.

22. The system of claim 21, wherein the computer program is further designed to model the plurality of latitudinal nodes of the cloth model as a plurality of physical splines by determining external forces on each of the latitudinal nodes of each physical spline.

23. The system of claim 19, wherein the computer program is further designed to model the plurality of longitudinal nodes of the cloth model as a plurality of stiff multi-section rods between adjacent latitudinal nodes.

24. The system of claim 23, wherein the computer program is further designed to model the plurality of longitudinal nodes of the cloth model as a plurality of stiff multi-section rods between adjacent latitudinal nodes by determining position of the longitudinal nodes based on position of the latitudinal nodes as modeled as the plurality of physical splines.

25. The system of claim 19, wherein the computer program is further designed to perform collision detection on the model.

26. The system of claim 25, wherein the computer program is further designed to perform collision detection by performing self-collision detection among the first-level latitudinal nodes and the second-level longitudinal nodes of the cloth model.

27. The system of claim 25, wherein the computer program is further designed to perform collision detection by performing collision detection between the cloth model and one or more external objects.

28. A machine-readable medium having instructions stored thereon for execution by a processor to transform a general-purpose computer to a special-purpose computer comprising:

a display on which to display a cloth model as rendered; and, means for:

modeling the cloth model having a plurality of latitudinal nodes decoupled from a plurality of longitudinal nodes; and, rendering the cloth model as modeled.

29. The medium of claim 28, wherein the means is further for modeling the plurality of latitudinal nodes of the cloth model as a plurality of physical splines.

30. The medium of claim 28, wherein the means is further for modeling the plurality of longitudinal nodes of the cloth model as a plurality of stiff multi-section rods between adjacent latitudinal nodes.

31. The medium of claim 28, wherein the means is further for performing collision detection on the model.

* * * * *